July 19, 1955 E. W. McFARLING ET AL 2,713,442
FERTILIZER APPARATUS
Filed April 16, 1954 2 Sheets-Sheet 1

INVENTORS
EXCEL W. McFARLING
GUY H. BRISCOE
ERNEST C. HATTON
ATTORNEYS

July 19, 1955   E. W. McFARLING ET AL   2,713,442
FERTILIZER APPARATUS
Filed April 16, 1954   2 Sheets-Sheet 2
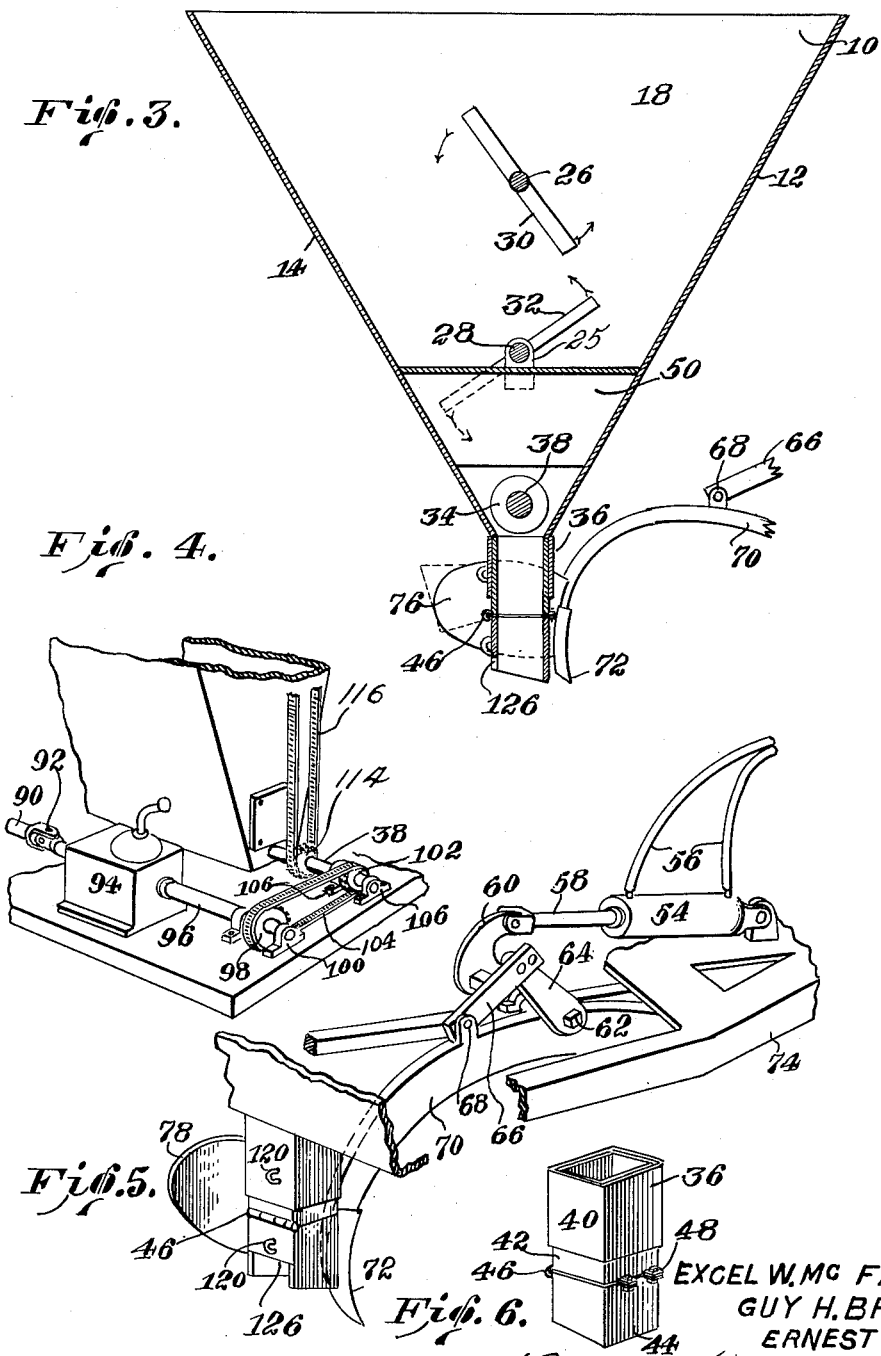
INVENTORS
EXCEL W. McFARLING
GUY H. BRISCOE
ERNEST C. HATTON
ATTORNEYS

United States Patent Office 2,713,442
Patented July 19, 1955

2,713,442

FERTILIZER APPARATUS

Excel W. McFarling, Guy H. Briscoe, and Ernest C. Hatton, Lubbock, Tex.

Application April 16, 1954, Serial No. 423,752

2 Claims. (Cl. 222—238)

This invention relates to a planter having a fertilizer apparatus and is particularly concerned with the apparatus for agitating and feeding the fertilizer.

An object of the invention, therefore, is to provide a planter having a fertilizer apparatus which agitates and feeds the fertilizer in a plurality of streams to the ground.

Another object is to provide a machine of this type in which the agitator and feeding means are arranged to feed fertilizer only when said means are operated.

Other objects will appear hereinafter throughout the specification.

In the drawings:

Figure 3 is a longitudinal vertical section of the planter shown in Figures 1 and 2;

Figure 4 is a perspective view, looking toward the left front corner of the machine, of the drive means and the hopper, the latter being broken away;

Figure 5 is a perspective view of one of the plows and associated parts, and the means for operating the same, with parts broken away, and Figure 6 is an elevational view of one of the chutes.

Figure 1:
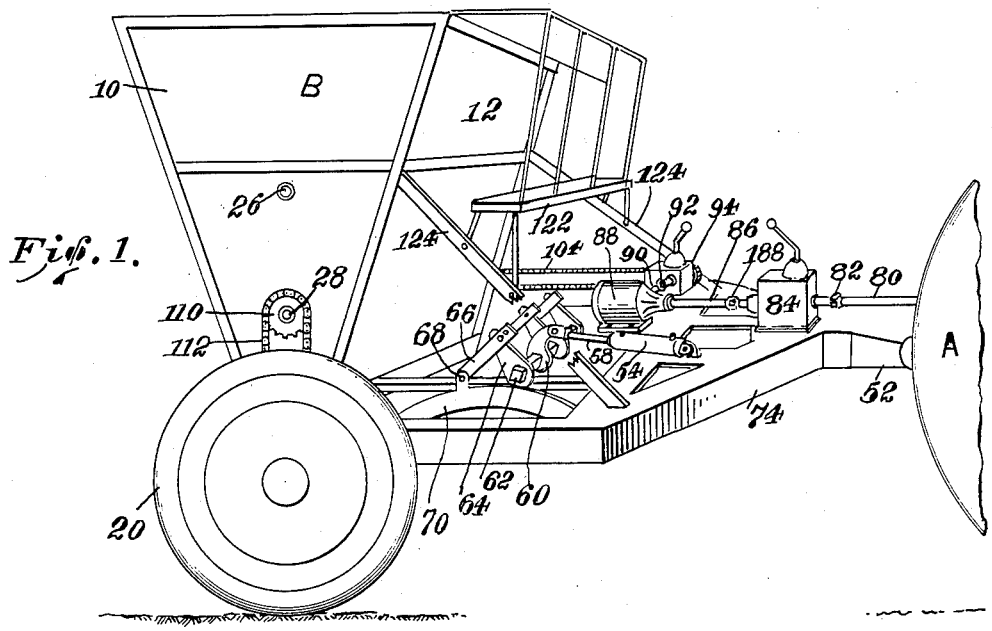
Figure 1 is a perspective view of the planter attached to a tractor, the latter being fragmentarily shown.

The purpose of this machine and method is to place barnyard manure underneath the surface of the soil in any desired concentration, where by being immediately available to the plants, it will require only a tenth as much manure to accomplish the same purpose as when broadcast on the surface of the soil. This stores and preserves the manure so that it will lose none of its properties from blowing, leaching or evaporation which occurs when spread on the surface of the soil. This way the amount of manure ordinarily broadcast on one acre of land will cover ten acres, so that it greatly reduces the cost to the farmer. It is estimated that barnyard manure applied by the present process will last up to five years so that it will give farmers a five-year period to get over their whole farm before necessary to start back over if they are able to apply manure to only a limited number of acres per year.

With the machine of the present invention, manure can be applied in any quantity from a half ton to four tons per acre, at any desired depth. Manure may be applied on 40-inch rows or 20-inch rows, or on flat ground, or on listed ground before planting. Growing crops can easily be side dressed with it, even until the plants are up to knee height.

Besides the very substantial saving to the farmer by making the manure cover ten times as much land and avoiding the loss of any of the manure's strength by leaching, blowing or evaporation, manure planted by this process also has a tendency to draw the feeder roots down deep into the warm, fertile, moist, chiseled furrow where the manure is applied, thereby providing a warm, fertile, moist root bed for the plant during cold spring weather. It also conserves moisture by drawing the roots down deep so that when the weather becomes dry, the roots are well established deep under the surface of the soil so that the temporary drying out of the top soil does not affect the plant.

Referring to the drawings, A is a tractor of any suitable make, and B is the planter as a whole that is being towed by the tractor. The planter comprises a bin or hopper 10 that is preferably constructed as shown in the drawings wherein there are forwardly and rearwardly inclined portions 12 and 14 and vertical side portions 16 and 18, respectively.

The manure planter is supported by a pair of ground engaging wheels 20 which preferably are so spaced as to track in a pair of furrows, between which are a plurality of furrows adapted to be engaged by the plows and plow wings hereinafter to be described.

Figure 2:
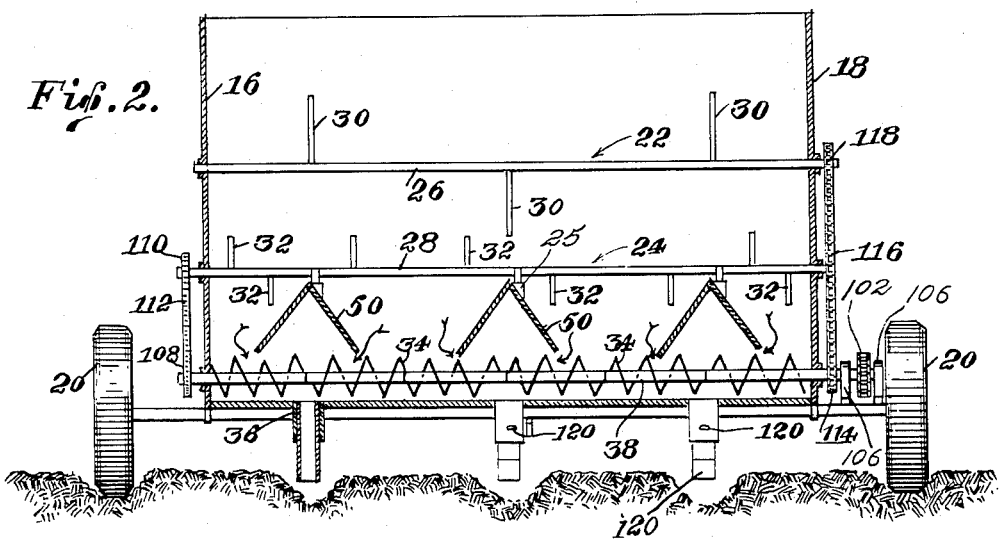
Figure 2 is a transverse vertical section of the planter, showing certain parts in full lines, and with the plows removed.

Located within the bin 10 are upper and lower agitators 22 and 24 which are mounted upon shafts 26 and 28, respectively. The shaft 26 of agitator 24 is additionally supported on bearing posts 25 attached near the apices of the covers 50, as clearly indicated in Figure 2. The upper shaft 26 is provided with spaced radially extending blades 30 while the lower shaft 28 is provided with similarly spaced blades 32, the latter of which are preferably shorter than the former. The blades on each shaft are so spaced, as indicated in Figures 2 and 3, that the sweep of each blade will not interfere with that of any other blade. As viewed in Figure 3, these blades rotate in a counterclockwise direction, although such direction of rotation is not essential.

As shown in Figure 2, an auger 34 is mounted adjacent the lower inside portion of the bin, and this auger is provided with spirals which feed the material toward each chute 36 from opposite directions. In other words, there are a pair of right and left hand screws each feeding toward its chute, so that rotation of the auger shaft 38 in one direction causes fertilizer to be fed from each side, toward each chute. The ends of the auger shaft extend through the side portions 16 and 18 of the bin. As seen in Figure 6, each chute comprises an upper portion 40, an upper inner portion 42 and a lower portion 44. At the rear of portions 42 and 44 is a hinge 46 hinging these two parts to each other. They may be held in the position shown in Figure 6 by means of the lugs and screws indicated at 48. The lower chute section 44 is shown in dotted lines in Figure 4 in its folded back position. In this position, more clearance is provided for overland travel and to avoid obstacles. Normally, when the plows are elevated as explained below, for overland travel or for other purposes, the chute section 44 will be folded back as explained.

Located intermediate the lower agitator 24 and above each of the chutes 36 are spaced covers or spreaders 50 in the shape of inverted V's in cross section as seen in Figure 2. These are located between the blades 32 of agitator 28, and each extends from wall 12 to wall 14 of the bin. Each cover is located immediately above one of the chutes, and the auger is located between the covers and the chutes, so as to move the material which falls down the sides of the covers toward that chute which is located beneath the cover, as shown by the arrows in Figure 2. The rear end of each chute has a cutout portion as shown at 126 in Figures 3 and 5, in order to assure proper depositing of the fertilizer, and to permit the soil to gradually fall back over the fertilizer as the machine moves over the ground.

The planter B is connected to the tractor A by a conventional tractor hitch 52 as shown in Figure 1.

As shown in Figures 1, 4 and 5, fluid to the hydraulic lift cylinder 54 is controlled by a valve, not shown, from the driver's seat that controls the flow of fluid through the conduits 56 to the said cylinder. Connected to the piston, not shown, in the hydraulic cylinder 54 is a piston rod 58, the rear end of which is connected to an arm 60 having a square opening in one end for turning the rockable squared shaft 62. An arm 64 preferably welded to this shaft is pivotally connected to link 66 whose opposite end is pivotally connected at 68 to the plow arm 70 of the planter suitably pivoted below platform 74. There are as many of these assemblies as there are chutes, as shown in Figures 1 and 2. Any suitable number of plows and chutes may be used consistent with the maneuverability of the machine.

Three plow points are shown at 72. The plows, the hydraulic lift cylinder and other parts are supported on the planter frame 74 as shown in Figures 1 and 5.

Rigidly fixed to each plow arm adjacent its point is a plow wing means comprising a pair of substantially parallel rearwardly extending wings 76, whose trailing edges are of curved outline as indicated at 78 in Figure 5. The plow wings extend rearwardly of each chute as shown in the drawings. It will be appreciated that each pair of plow wings moves in accordance with the movement of its plow arm, as adjusted by the hydraulic lift cylinder.

The means for driving the agitator and the auger consists of a power off-take shaft 80 from the tractor, having a universal joint 82, the shaft being connected to a first manually controlled speed transmission 84. Extending rearwardly on this transmission is a shaft 86 having a universal joint 188, shaft 86 being connected to the differential 88. Extending from one side of the differential and at right angles to shafts 80 and 86 is a shaft 90, see Figures 1 and 4, which last-mentioned shaft has a universal joint 92. This shaft connects into the second manually controlled speed transmission 94. The driven shaft of transmission 94 is indicated at 96. Adjacent one end of the shaft 96 is a sprocket wheel 98 mounted in bearings 100 which sprocket wheel drives, through sprocket wheel 102 and chain 104, auger shaft 38, mounted to rotate in bearings 106. Auger shaft 38 has mounted thereon the sprocket wheel 108 that drives sprocket wheel 110 through chain 112 as seen in Figure 2. Sprocket wheel 110 is mounted adjacent one end of the lower agitator shaft 28. The upper agitator shaft 26 is driven at the opposite end of the auger shaft 38 by means of the sprocket wheel 114, chain 116, and sprocket wheel 118. It will be appreciated, however, that the arrangement of chains 116, 112 may be such that they are both mounted adjacent either vertical side portion 16 or 18 of bin 10.

Referring to Figure 5, each chute may be provided with one or more hooks 120 for the attachment for a conventional drag, not shown, should this be found necessary, in accordance with the amount of moisture and other factors relating to the soil being fertilized.

Referring to Figure 1, it will be seen that the bin is provided with a cat walk 122 mounted on braces 124, which connect the upper part of bin 12 to the framework 74.

*Operation*

The machine is particularly adapted for fertilizing soil in preparation for the planting of cotton and other crops. Preferably, the soil will be listed before the manure planter is used, and the purpose and one of the principal objects of the present invention is to fertilize an area of ground, using a minimum of fertilizer but accomplishing better results as would be accomplished by using a greater amount of fertilizer as heretofore stated.

As previously stated, the wheels 20 preferably follow in the outside furrows, and the manure is planted in a plurality of furrows of previously listed land, three furrows being treated at one time; although the number of furrows being planted at one time could be varied according to the size of the machine. During transportation to or from a field, or when making a turn at the end of the field, transmission 84 is disconnected so that the auger and agitators will be inoperative. During such movements to and from the field and when turning at each end of the rows, one of the manually operated transmission 84 or 94 may be operated to disconnect the drive from the shaft 80 from the tractor to the auger shaft 38 and upper and lower agitator shafts 26 and 28. During this time, the covers or spreaders 50 prevent the falling down by gravity of the fertilizer from the interior of the bin to the several chutes so that there will be no depositing of fertilizer during such movements. Also during such movement and, on occasion, to avoid obstacles, the plows may be lifted and the lower chute sections may be folded back as described above.

Assuming that the bin has been loaded, preferably with barnyard manure, the machine is pulled by the tractor A, and the auger and agitator are connected so as to rotate within the bin. As the machine travels over the ground, the augers move the material from opposite directions; that is, from either side of each of the covers 50, towards each chute 36.

As will be seen by reference to Figure 3, each plow point 72 has plowed ground in each furrow in front of its chute. The fertilizer material is deposited continuously by means of the auger into each of the chutes where it falls by gravity into the furrow immediately in the rear of its plow point 72. During this time, the plowed soil is held back from opposite sides by the plow wings 76, and as soon as these wings have passed, the soil falls back by gravity so as to completely cover the deposited fertilizer. During some fertilizer planting operations, depending upon the condition of the soil, as stated heretofore, it may be necessary to attach a drag to the hooks 120 as shown in Figure 5, but in the great majority of planting operations, this will be unnecessary. The curved ends 78 of the wings 76 are provided because the lower edges of the wings engage the ground and, in practice, perform a digging operation, so as to enlarge the opening made by the plow point 72, and the trailing edges 78 relieve the pressure in the furrow and permit the lower portion of the earth to fall back before the upper portion of the earth falls back on top of the manure.

A preferred method of operation should include the listing of the soil in order to break the ridges. The furrows are then watered down and a second listing is performed.

Following these operations, the manure planter is caused to move over the ground and plant the manure as described above. It will be understood that various kinds of fertilizer may be used.

The machine may be used to plant manure on unlisted soil.

By reference to Figures 3 and 5, it will be noted that the wings 76 extend substantially parallel to each other and fairly closely adjacent to the side of each chute.

The two transmissions 84 and 94 are connected in series. Each is preferably provided with means for three speed changes in order to reach the proper speed for the auger and agitators. With the transmissions arranged as shown and described herein, it is possible to get anything from a 1-to-1 up to a 21-to-1 speed change.

It will be understood that the manure planter described herein may be used for planting various other materials, such as grain of various kinds, and the term "manure planter" in the claims includes planters for planting various kinds of materials.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

We claim:
1. A fertilizer apparatus, comprising a frame, a hopper mounted thereon having downwardly and inwardly inclined front and rear sides, a pair of rotary agitator shafts mounted one above the other in said hopper parallel to said inclined sides, spaced agitator arms on said shafts, a plurality of openings in the bottom of said hopper, an auger at the bottom of said hopper having pairs of right and left helices, one pair for each opening, an inverted V-shaped cover over each opening between the lower agitator shaft and the auger to retard passage of material to the openings, bearing posts on said covers near the apices thereof, the lower agitator shaft being supported in said bearing posts, the spaced agitator arms on said lower agitator shaft including pairs of spaced arms with a pair thereof associated with each of said covers so the arms of the pair are on opposite sides of the bearing post on the associated cover, each arm of the pair during rotation of the lower agitator shaft travelling in a path of rotation a portion of which is in proximity to the adjacent side of the associated cover, and means interconnecting said auger and agitator shafts for operating the same in unison.
2. The structure of claim 1, wherein each of said arms on said upper agitator shaft travels in a path of rotation a portion of which is disposed between the paths of rotation of said pairs of arms on said lower agitator shaft.

References Cited in the file of this patent
UNITED STATES PATENTS

| | | | |
|---|---|---|---|
| 205,971 | Mast et al. | July 16, | 1878 |
| 721,733 | Nance | Mar. 3, | 1903 |
| 832,907 | Harter | Oct. 9, | 1906 |
| 835,810 | Collins | Nov. 13, | 1906 |
| 897,829 | Harper | Sept. 1, | 1908 |
| 908,811 | Smith | Jan. 5, | 1909 |
| 963,249 | Reveley | July 5, | 1910 |
| 1,403,801 | Mann | Jan. 17, | 1922 |
| 1,416,331 | Campbell | May 16, | 1922 |
| 1,517,715 | DeGeus | Dec. 2, | 1924 |
| 2,222,015 | Bateman | Nov. 19, | 1940 |
| 2,351,256 | Fischer | June 13, | 1944 |
| 2,429,841 | Phillips | Oct. 28, | 1947 |
| 2,522,693 | Stiteler | Sept. 19, | 1950 |
| 2,595,461 | James | May 6, | 1952 |
| 2,657,831 | Pierce | Nov. 3, | 1953 |

FOREIGN PATENTS

| | | | |
|---|---|---|---|
| 219,950 | Germany | Mar. 12, | 1910 |